US005258164A

United States Patent [19]

Bloom et al.

[11] Patent Number: 5,258,164

[45] **Date of Patent: * Nov. 2, 1993**

[54] ELECTRICALLY REGENERABLE DIESEL PARTICULATE TRAP

[75] Inventors: Richard L. Bloom, Woodville, Wis.; William T. Fay, St. Paul, Minn.; Joel H. Sabean, Eagan, Minn.; Mark P. Smith, Lino Lakes, Minn.

[73] Assignee: Minnesota Mining and Manufacturing Company, St. Paul, Minn.

[ * ] Notice: The portion of the term of this patent subsequent to Sep. 28, 2010 has been disclaimed.

[21] Appl. No.: 680,812

[22] Filed: Apr. 5, 1991

[51] Int. Cl.[5] ........................ F01N 3/10; B01D 50/00; B01D 53/54

[52] U.S. Cl. .................................... 422/174; 422/180; 422/181; 422/171; 60/299; 60/311; 55/484; 55/520; 55/527

[58] Field of Search ............... 422/171, 174, 180, 181; 55/DIG. 10, DIG. 30, 484, 520, 527; 60/299, 311

[56] References Cited

U.S. PATENT DOCUMENTS

| | | | |
|---|---|---|---|
| 3,869,267 | 3/1975 | Gaylor | 55/DIG. 30 |
| 3,920,428 | 11/1975 | Kinsley, Jr. | 55/528 |
| 4,264,346 | 4/1981 | Mann | 55/523 |
| 4,276,071 | 6/1981 | Outland | 55/523 |
| 4,324,572 | 4/1982 | Erdmannsdorfer | 55/385 |
| 4,376,637 | 3/1983 | Yang | 55/DIG. 30 |
| 4,427,418 | 1/1984 | Kogiso et al. | 55/287 |
| 4,456,457 | 6/1984 | Nozawa et al. | 55/DIG. 30 |
| 4,543,113 | 9/1985 | Forester et al. | 55/378 |
| 4,576,799 | 3/1986 | Worner | 422/176 |
| 4,613,350 | 9/1986 | Forester et al. | 65/2 |
| 4,744,216 | 5/1988 | Rao et al. | 60/303 |
| 4,813,231 | 3/1989 | Bykowski | 60/274 |
| 4,940,476 | 7/1990 | Buck | 55/DIG. 30 |
| 5,042,249 | 8/1991 | Erdmannsdoerfer | 422/171 |
| 5,171,341 | 12/1992 | Merry | 55/484 |
| 5,174,968 | 12/1992 | Whittenberger | 422/174 |
| 5,174,969 | 12/1992 | Fischer et al. | 422/180 |

FOREIGN PATENT DOCUMENTS

| | | |
|---|---|---|
| 0358522 | 3/1990 | European Pat. Off. . |
| 3828516 | 3/1989 | Fed. Rep. of Germany . |

OTHER PUBLICATIONS

Japanese Abstract No. 56-46405 (Sumiyoshi), published Oct. 7, 1982.

Sales Brochure entitled "Filter Cartridge Sealing Systems", from Filterite (a Brunswick Corporation) of Timonium, Md., Bulletin NO. 1795.

SAE Technical Paper Series, 870015, titled "Experiences in the Development of Ceramic Fiber Coil Particulate Traps," 1987, H. O. Hardenberg and H. L. Daudel, pp. 67-78.

SAE Technical Paper Series, 870011, titled "Urban Bus Application of a Ceramic Fiber Coil Particulate Trap," 1987, H. O. Hardenberg, pp. 17-26.

*Primary Examiner*—James C. Housel
*Assistant Examiner*—N. Bhat
*Attorney, Agent, or Firm*—Gary L. Griswold; Walter N. Kirn; Gregory D. Allen

[57] ABSTRACT

An electrically regenerable diesel particulate trap or filter comprising an electrically resistive expanded metal sheet or sleeve which when energized heats the filter element to a temperature sufficient to allow the trapped soot particulates to burn.

29 Claims, 6 Drawing Sheets

ELECTRICALLY REGENERABLE DIESEL PARTICULATE TRAP

FIELD OF THE INVENTION

This invention relates to electrically regenerable diesel particulate filters or traps.

BACKGROUND ART

Diesel engines emit a hazardous, sooty exhaust that can be rendered less hazardous by using diesel particulate filters. The soot trapped by such filters builds up over time, requiring periodic regeneration (i.e., removal of the entrapped soot).

Two techniques for regenerating diesel particulate filters predominate. One technique involves the periodic release of a burning gas. The other technique utilizes electrical heating elements in contact with the filtering element. An example of the latter technique is disclosed in Offenlegungsschrift No. DE 38 00 723 (Heuer et al.), laid open Jul. 27, 1989, wherein the regenerable particulate filter trap has at least one filter element arranged in a filter housing, with a wire heating device on the exterior of the filter element.

European Pat. Appl. No. 0 275 372 (Gürtler et al.), laid open Jan. 3, 1990, discloses a soot filter having a heating element located on the interior or exterior surface of the filter element, where the heating element can consist of crossed wires, expanded metal, or a perforated metal plate.

U.K. Pat. Appln. GB 2193656 (Henkel), laid open Feb. 17, 1988, discloses a regenerable diesel particulate trap wherein the filter elements are helically wound with two wires which are continuously maintained under an electrical potential. When carbon particles (i.e., soot) buildup on the filter element, such that the conductivity gap between the two wires is closed, electric current flows through the resisting carbon particles causing them to heat up to the point where they ignite.

SUMMARY OF THE INVENTION

Briefly, the present invention provides a diesel particulate filter comprising (a) a casing having at least two ends;

(b) means for connecting the ends of the casing to an exhaust system;

(c) at least one filtering element partially filling the casing;

(d) at least one electrically resistive expanded metal sheet, wherein substantially the entire area of each face of the expanded metal sheet is in contact with the filtering element;

(e) means for forcing exhaust gases to pass through both the filtering element and the expanded metal sheet; and (f) means for applying a voltage across the expanded metal sheet to heat it above the combustion point of entrapped diesel exhaust particulates.

To minimize the amount of electrical power expended at any instant in time, the novel diesel particulate trap preferably comprises a plurality of separate expanded metal sheets uniformly distributed throughout the filtering element, and means for independently actuating each of the expanded metal sheets at different times (e.g., sequentially). To further save electrical power, by preventing the exhaust from dissipating the electrically generated heat, the trap preferably also incorporates means for blocking the exhaust from passing through an expanded metal sheet while it is being energized.

The present invention provides a more efficient means for electrically regenerating a diesel particulate filter or trap than such methods known in the art.

To provide uniform heating, the expanded metal sheet is preferably in intimate contact with the filter element.

Because substantially the entire area of each face of each expanded metal sheet is in contact with the filter element, very little electrically generated heat is wasted. Further, the heat-insulating nature of the filtering element tends to confine the heat, minimizing the energy required to burn off the entrapped soot particles.

Another advantage of the inventive regeneration means is that in the unlikely event that a strand of the expanded metal sheet should break, only that portion of the filtering members immediately adjacent to the break would be affected.

One preferred filter according to the present invention comprises a perforated tube comprising a filtering element with the electrically resistive expanded metal sheet embedded within the filter element. This construction offers several advantages over conventional regenerable filters having an interior or exterior heating element. For example, for a conventional electrically regenerable filter having an interior heating element, the heating element serves both as a support means for the filter element and as a means for burning away entrapped soot. For support purposes, such an interior heating element tends to be thicker than that required for an efficient heater. In contrast, the present invention provides a filter wherein the filter element is supported by a perforated tube, rather than by a heating element. Such a construction allows the utilization of an electrically efficient heater element. Further, a conventional electrically regenerable filter having an exterior heating element tends to be inefficient because a substantial amount of heat typically radiates radially out from the portion of the heating element which is not in contact with the filter element. Because the heating element in the inventive filter is embedded within the filter element, which is heat-insulating, the efficiency problem associated with exterior heating elements is minimized.

In this application:

"inorganic fiber" refers to any inorganic-based fiber which is resistant to high temperature (e.g., temperatures above about 600° C.), is chemically resistant to diesel exhaust gas, and has textile qualities (i.e., is suitable for the winding, weaving, etc. required to make a filter element);

"yarn" means a plurality or bundle of individual fibers or filaments;

"heat-fugitive fiber" refers to a fiber comprising constituents which decompose and volatilize when heated (e.g., organic material);

"fiber segment" refers to the portion of a broken fiber protruding from the core of the yarn; and "fibrillated film" refers to yarns produced by mechanically or ultrasonically separating lineal fibers from oriented extruded film.

BRIEF DESCRIPTION OF THE DRAWING

The invention may be more easily understood in reference to the drawing, all figures of which are schematic. In the drawing.

DESCRIPTION OF THE PREFERRED EMBODIMENTS

The present invention provides an efficient, economical means for regenerating (i.e., burning out the collected soot) a diesel particulate trap or filter.

Figure 1:
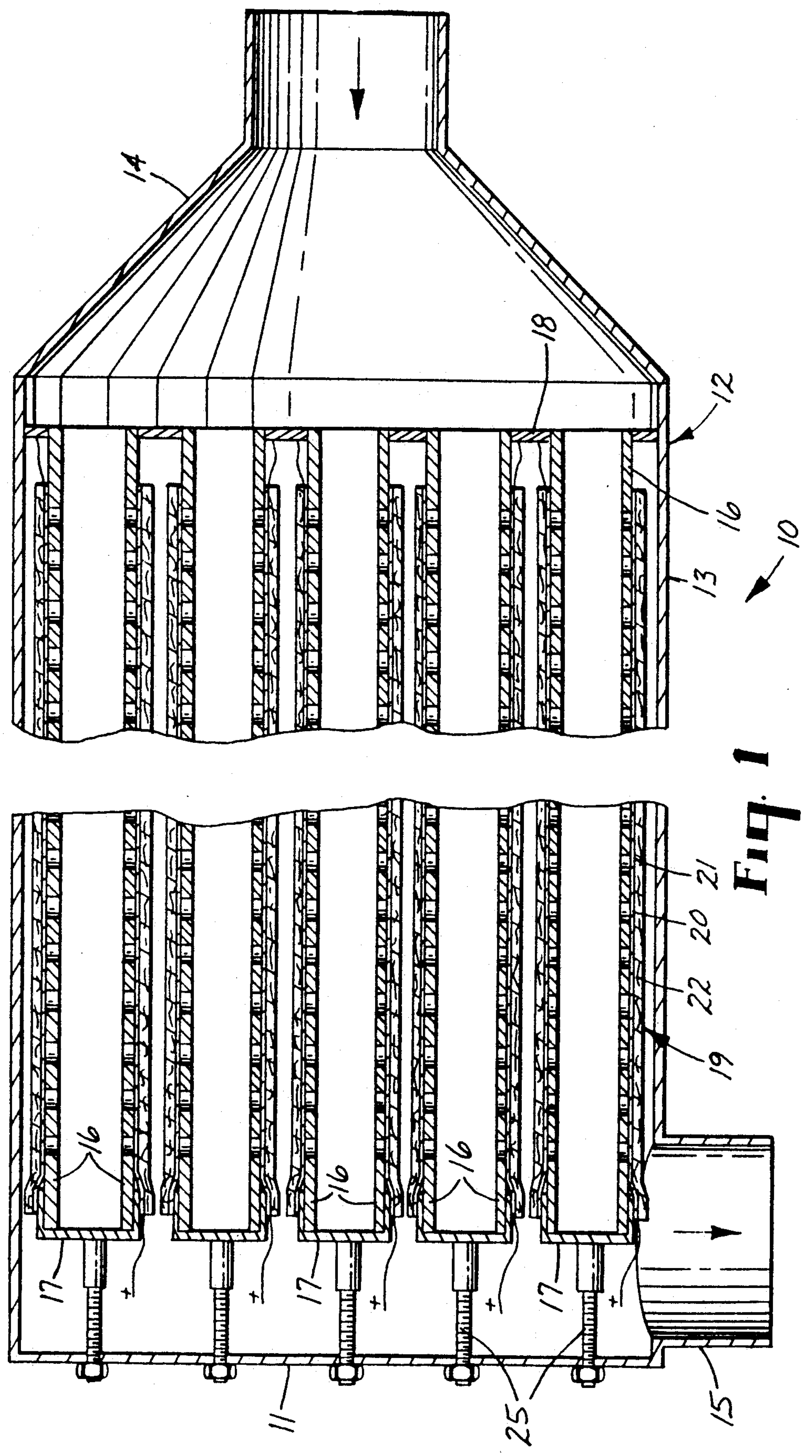
FIG. 1 is a longitudinal central section through a preferred diesel particulate trap according to the invention.
Figure 2:
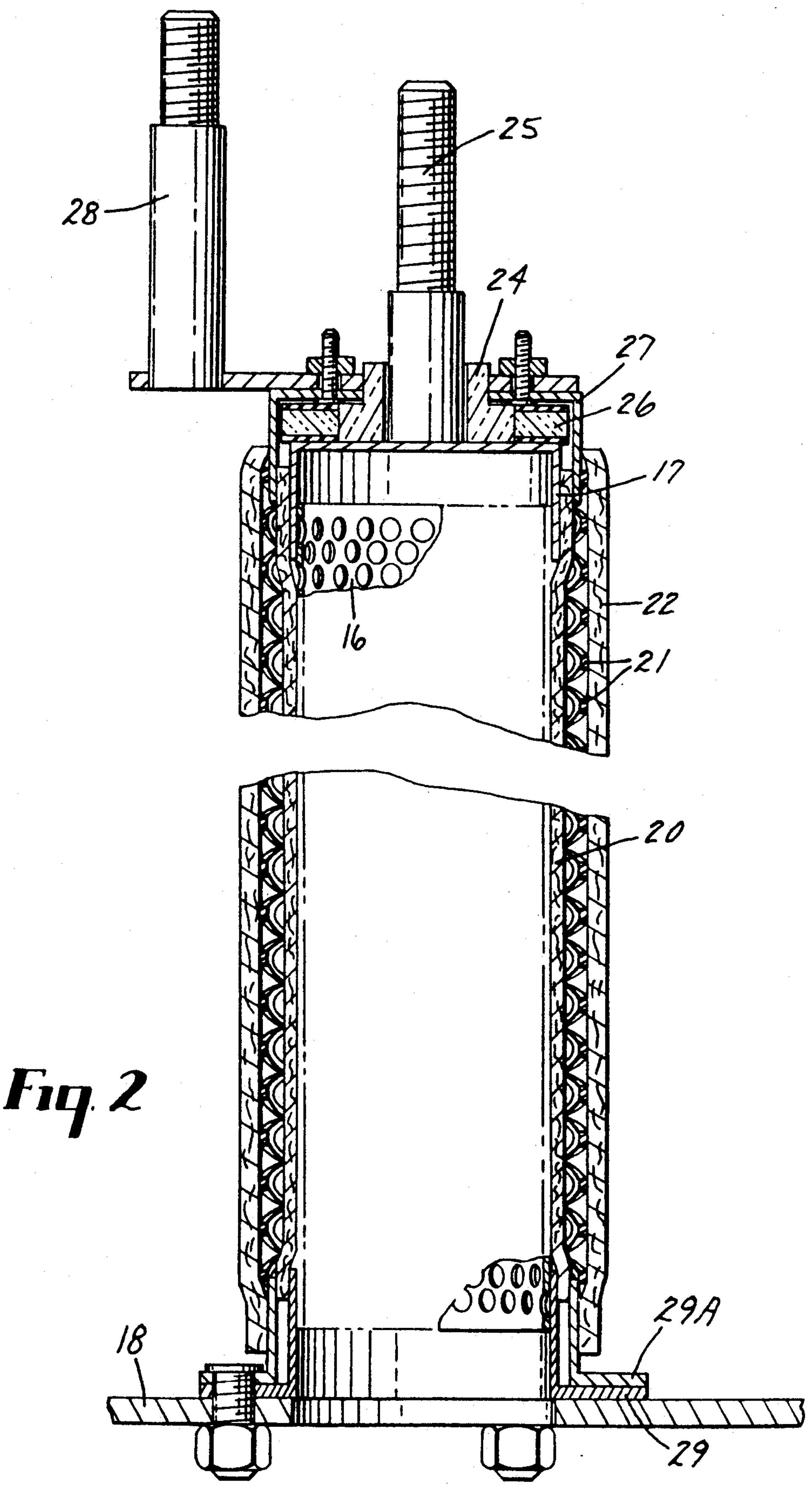
FIG. 2 is an enlarged longitudinal cross section through one of the cartridges of the diesel particulate filter of FIG. 1.

Referring to FIGS. 1 and 2, diesel particulate trap 10 comprises casing 12, comprising cylindrical body 13, conical exhaust inlet 14, and lateral exhaust outlet 15. Within cylindrical body 13 are a plurality of parallel, side-by-side, rigid, perforated tubes 16, each of which is open adjacent exhaust inlet 14 and blocked adjacent exhaust outlet 15 by circular cap 17, wherein circular cap 17, is secured to end wall 11 by post 25. Connected to tubes 16 at their open ends is circular plate 18 that has circular openings to receive tubes 16. Plate 18 also is connected to cylindrical body 13, blocking the spaces between adjacent tubes and blocking the spaces between the tubes and the cylindrical body 13 such that exhaust gas entering inlet 14 passes radially and outwardly through perforations of the tubes before exiting through an unblocked space adjacent outlet 15.

Referring to FIG. 2, each of tubes 16 is assembled with associated hardware as a cartridge. An inorganic yarn is substantially helically wound or cross-wound over the perforated area of each of the tubes to provide inner filtering element 20. Covering inner filter element 20 is electrically resistive expanded metal sleeve 21. Overlying metal sleeve 21 is outer filtering element 22 comprising substantially helically wound or cross-wound inorganic yarn.

Cap 17 is covered by annular electrical insulator 24 which has an axial bore for support stud 25, that is integral with cap 17. Fitted around insulator 24 is electrical insulated annular washer 26 comprised of coated inorganic yarns. The end of expanded metal sleeve 21 is connected to annular collar 27, which is electrically connected to electrical post 28. Electrical post 28 can be connected to a conventional switch (not shown) leading to a conventional power source (not shown).

The open end of each of tubes 16 fit into first annular collar 29, and inner filtering element 20 extends over the imperforate area provided by that collar. The adjacent end of expanded metal sleeve 21 is connected to a second annular collar 29A, and outer filtering element 22 extends over that collar. Upon installing each cartridge 19 into diesel particulate trap 10, first and second collars 29 and 29A, respectively, are connected (e.g., bolted) to plate 18, electrically grounding expanded metal sleeve 21 through casing 12. Closing of the aforementioned switch applies a voltage across the expanded metal sleeve to heat it resistively to a temperature at which soot trapped by the filtering elements is burned off. To minimize the amount of electrical power expended at any instant in time, it is preferable that the switches connected to electrical posts 28 are closed and reopened sequentially one at a time.

Optionally, a nonwoven mat comprising inorganic fiber is interposed between the outer surface of at least one of tubes 16 and the substantially helically wound or cross-wound inorganic yarn.

Optionally, heat-fugitive yarn can be substantially helically wound or cross-wound around at least one of tubes 16 or expanded metal sleeves 21, in addition to the inorganic yarn.

Figure 3:
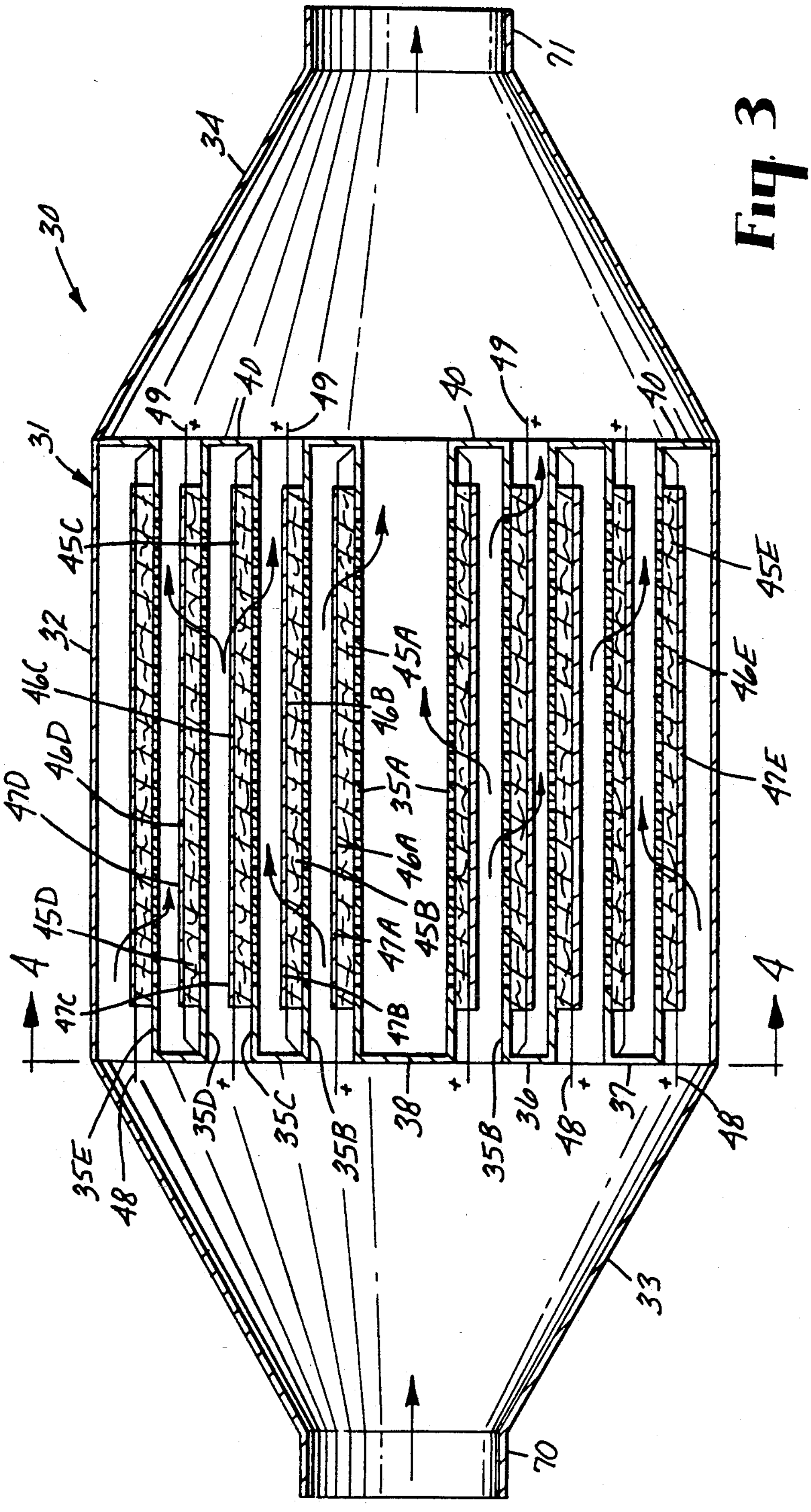
FIG. 3 is a longitudinal central section through another preferred diesel particulate trap according to the invention.
Figure 4:
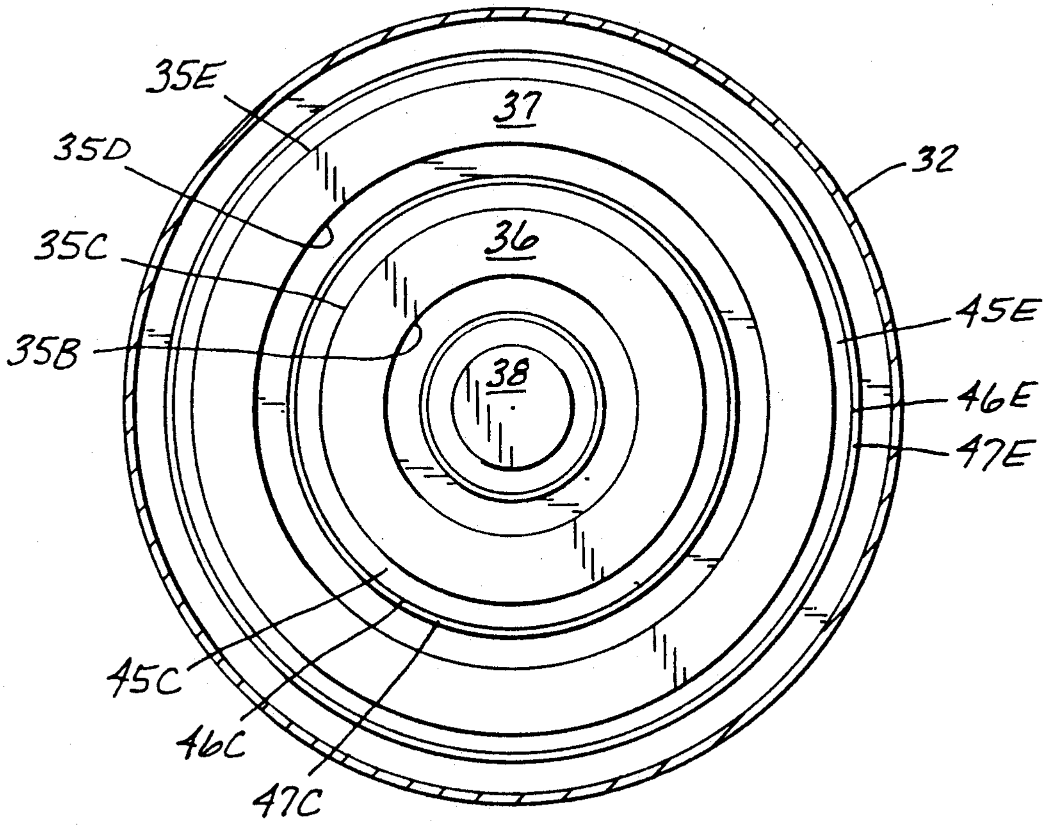
FIG. 4 is a cross section along line 4—4 of FIG. 3.

Referring to FIGS. 3 and 4, diesel particulate filter 30 has an elongated casing 31 having cylindrical body 32, conical exhaust inlet 33, and conical exhaust outlet 34. Within cylindrical body 32 and extending between the inlet and outlet ends of cylindrical body 32 are five concentric, spaced, rigid tubes 35A–E that radially fill cylindrical body 12. The walls of tubes 35A–E are perforated throughout their length except for an imperforate area at each extremity of each tube. Connected to the inlet extremities of tubes 35A–E are annular caps 36 and 37 and central circular cap 38. Connected to the outlet extremities of tubes 35A–E are annular caps 40. Caps 40 block, at outlet end 71, alternate spaces between the tubes.

Inorganic yarn is independently substantially helically wound or cross-wound around the perforated surfaces of tubes 35A–E to provide inner filtering elements 45A–E. Exhaust entering the unblocked spaces at inlet end 70 passes into spaces between tubes 35A–E, that are not blocked by caps 36, 37, and 38, and radially inwardly and outwardly through inner filtering elements 45A–E before exiting through spaces not blocked by caps 40, at outlet end 71.

Covering inner filtering elements 45A–E are electrically resistive expanded metal sleeves 46A–E. Inorganic yarn is independently substantially helically wound or cross-wound around expanded metal sleeves 46A–E to provide outer filtering elements 47A–E. Typically, upstream filtering elements 47A–E are thinner than downstream filtering elements 45A–E.

At the inlet of casing 31, electrical leads 48 are connected to each of expanded metal sleeves 46A, 46C, and 46E through a conventional switch (not shown) to a conventional power source (not shown). At the outlet of casing 31, electrical leads 49 are connected to each of expanded metal sleeves 46B and 46D through a switch not shown and a power source (not shown). The opposite edges of expanded metal sleeves 46A–E are electrically connected to ground through caps 36, 37, 38, and 40.

Optionally, a nonwoven mat comprising inorganic fiber is interposed between the outer surface of at least one of tubes 35A–E or expanded metal sleeves 46A–E and the substantially helically wound or cross-wound inorganic yarn.

Optionally, heat-fugitive yarn can be substantially helically wound or cross-wound around at least one of tubes 35A–E or expanded metal sleeves 46A–E, in addition to the inorganic yarn.

The casing, blocking means, plates, and posts can be independently comprise any suitable material including, for example, metals or ceramics. For ease of manufacture, the preferred material is a metal. Preferably, the metal is stainless steel sheet metal. Means for connecting the casing, blocking means, plates, and posts include those known in the art for the particular material of which the casing, blocking means, plates, and posts are comprised. For example, if the casing, blocking means, plates, and posts are made of metal, the preferred means for connecting them is welding.

The shape of the casing can vary by convenience. Suitable shapes include, for example, those having a circular cross-section, an elliptical cross-section, an square cross-section, and a rectangular cross-section. For a diesel particulate filter comprising concentric filter elements, the casing preferably has a circular or elliptical cross-section. The casing typically is elongated to allow it to have a slim profile.

The perforated tubes can comprise any suitable material including, for example, metals and ceramics. The perforated tubes can be, for example, a tube with holes, a wire screen, or an expanded metal, provided it is substantially rigid. Although perforated ceramic tubes may provide excellent performance, it might be unduly expensive to apply suitable blocking means. Preferably, the perforated tubes comprise a metal. More preferably, the metal is stainless steel sheet metal.

The shape of the tubes can vary by convenience, as described above for the casing. Preferably, the tubes have a circular or elliptical cross-section.

The perforations of each tube should be as large as possible while maintaining rigidity. Preferably, each perforation is of a diameter in the range from about 1 to about 20 mm, far too large to trap any particle in the exhaust. More preferably, each perforation is of a diameter in the range from about 2 to about 10 mm, and most preferably in the range from about 3 to about 7 mm.

The size of individual holes may be the same, different, or a combination thereof.

Preferably, the perforations occupy in the range from about 40 to about 80 percent of the total projected area of each tube. More preferably, the perforations occupy in the range from about 50 to about 70 percent of the total projected area of each tube. An open area substantially above 80 percent may significantly affect the structural integrity of the tube. On the other hand, an open area substantially below 40 percent, may cause undesirably high back pressures during use.

The perforations are preferably uniformly distributed over the surface of each tube, except the ends of the tubes which are preferably imperforate.

Preferably, the inorganic yarn has a diameter in the range from about 0.5 to about 5 mm. More preferably, the diameter is in the range from about 1 to about 3 mm. Yarn diameters in the specified ranges typically have superior textile qualities as compared to yarns with diameters outside of these ranges. Such yarns typically comprise in the range from about 780 to about 7800 individual inorganic fibers. Preferably, the inorganic yarn comprises in the range from about 1560 to about 4680 individual fibers.

Preferably, the inorganic yarn is ply-twisted because such a construction can be texturized to provide a superior filtering material than can inorganic yarn which is not ply-twisted.

The inorganic fibers preferably have a diameter in the range from about 5 to about 20 micrometers. More preferably, the inorganic fibers have a diameter in the range from about 7 to about 15 micrometers, and most preferably, in the range from about 9 to about 14 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken when texturized). Fibers substantially above 20 micrometers in diameter typically provide a filter which is less efficient than do fibers having diameters within the specified ranges.

The inorganic fibers comprising the inorganic yarn are preferably ceramic. The ceramic fibers can be, for example, amorphous, polycrystalline, or a combination thereof.

Useful ceramic yarns include, for example, those comprising fibers made of alumina-boria-silica, alumina, silica, silicon carbide, and boron nitride. Preferably, the ceramic fiber comprises an alumina-boria-silica. To aid in handling, the yarns are preferably sized using conventional sizing techniques. Alumina-boria-silica fibers are commercially available, for example, under the trademarked designations "NEXTEL 312 CERAMIC YARN" and "NEXTEL 440 CERAMIC YARN" from the 3M Co. of St. Paul, Minn.

Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

For enhanced filtering efficiency, the inorganic yarn is preferably substantially helically cross-wound around the perforated tube. More preferably, the yarn is substantially helically cross-wound around the tube to form 4-sided openings.

Preferably, the inorganic yarn comprises a dense core from which at least one of loops of continuous fibers and fiber segments extend outwardly, wherein the cores of successive convolutions of each successive layer are radially aligned to provide relatively dense walls that are spaced to define 4-sided openings, and wherein the loops of fibers and the fiber segments project into each of said openings, with loops of fibers and fiber segments of adjacent convolutions being intermeshed to provide with each of the openings a trap for diesel exhaust particulates.

To form the 4-sided openings, the winding angle of each successive layer (i.e., one complete covering of the tube before the 4-sided pattern repeats) of yarn is slightly increased (i.e., about 0.25°) such that the core of the yarn is radially aligned with the underlying core. This winding arrangement results in adjacent convolutions being widely spaced in the first pass and then interspersed with subsequent convolutions until the spacings between adjacent convolutions are uniform. This arrangement inherently results in the interweaving of oppositely directed convolutions in each of the layers providing stabilization to the filtering element against exhaust forces.

The radially aligned cores on a tube collectively form relatively dense walls which are spaced to define 4-sided openings (i.e., diamond-shaped). Fiber segments, fiber loops, or combinations thereof project into each of the openings, with fiber segments and fiber loops of laterally adjacent convolutions being intermeshed.

As the windings extend into the imperforate areas, the winding angle is preferably changed under computer control so that adjacent convolutions of the yarn are progressively brought more closely together to provide relatively thick end walls that are substantially impervious to the flow of exhaust.

The density of fiber segments and loops of continuous fiber tend to increase from the outer face to the base of each opening, providing a distribution of particulate traps over the full depth of the filtering element. The filtering capability of the filter element can be enhanced by using higher texturized yarn in the downstream region and using progressively less texturized yarn in the regions further upstream.

Preferably, the angle at which a filtering element is wound is in the range from about 30° to about 70°, to the axis of the tube in each winding direction. More preferably, the winding angle is in the range from about 30° to about 60°. Most preferably, the winding angle is in the range from about 45° to about 55°. Use of winding angles within the specified ranges typically provide a filtering element which is more efficient and is better secured to tube than filters wound at an angle substantially outside of these ranges.

For a single cross-wound circuit (i.e., one winding pass in each direction), the 4-sided openings (where they cover the perforated areas) are preferably of uniform size and shape.

Preferably, the opening size between opposite corners of the 4-sided openings is in the range from about 3 mm to about 10 mm in the axial direction of the tube and in the range from about 6 to about 12 mm in the circumferential direction of the tube. More preferably, the opening size between opposite corners of the 4-sided openings is in the range from about 4 mm to about 7 mm in the axial direction of the tube and in the range from about 7 mm to about 10 mm in the circumferential direction of the tube. Openings substantially larger than the stated ranges may provide inadequate filtering efficiency, whereas openings substantially smaller than the stated ranges may result in undesirably high back pressures.

In winding the yarn around the perforated tube, the winding tension is preferably as high as possible, without breaking the yarn. Typically the winding tension is in the range from about 9.8 to about 19.6 Newtons.

To increase the accumulation of soot near the expanded metal sheet, the region of the filter element upstream from the expanded metal sheet is preferably relatively free of loops of continuous fibers and fiber segments (i.e., lightly texturized). More preferably, the region of the filter element upstream from the expanded metal sheet is non-texturized.

Each filtering element can comprise one or more layers of substantially helically wound cross-wound inorganic yarn, or it can comprise one or more nonwoven mats comprising inorganic fibers, wherein the mat is held against the radially outward perforated surface of each tube by substantially helically wound cross-wound inorganic yarn.

For a filtering element comprising the substantially helically wound cross-wound texturized yarn comprising ceramic fibers, it may be desirable to incorporate some heat-fugitive yarn into the windings. The passageways left behind when the heat-fugitive yarn are burned away during or prior to the first use of the filter may provide both reduced back pressure and enhanced access to the filtering fibers.

For a filtering element further comprising a nonwoven mat comprising inorganic fibers, the mat preferably is selected to allow a high degree of filtering efficiency without significant back pressure. Typically, the fibers comprising the nonwoven mat have a diameter up to about 6 micrometers. Preferably, the fibers comprising the nonwoven mat have a diameter up to about 3 micrometers, wherein fibers having such a diameter can be referred to as "microfibers." More preferably, the microfibers have a diameter in the range from about 1 to about 3 micrometers. A preferred nonwoven mat comprises ceramic blown microfibers. Preferably, the ceramic fibers are made of alumina-boria-silica, alumina, silica, silicon carbide, or boron nitride. More preferably, the nonwoven mat comprises alumina-boria-silica blown microfibers.

Suitable nonwoven mats are commercially available, and include those marketed under the trademarked designations "ULTRAFIBER 312" and "ULTRAFIBER 440" from the 3M Co. and "SAFFIL LD MAT" from Imperial Chemicals, Inc. of Cheshire, U.K.

The relative fineness and inherent large surface area of a nonwoven mat as compared to yarns of inorganic fiber, allows a filtering element comprising a nonwoven to be thinner while having the same filtering efficiency as a filter element which uses a texturized yarn of inorganic fibers. A filtering element comprising substantially helically wound cross-wound texturized yarn of inorganic fibers, however may be more economical to produce than one incorporating one or more layers of nonwoven mat. Further, an equal volume of the substantially helically wound cross-wound texturized yarn typically can trap more soot than an equal volume of the nonwoven mat.

Preferably, each inner filtering element has a thickness in the range from about 1 to about 25 mm. For inner filtering elements comprising substantially helically wound cross-wound, texturized yarn comprising inorganic fibers, the preferred total thickness of the wound cross-wound fibers is in the range from about 5 to about 15 mm. For an inner filtering element comprising substantially helically wound cross-wound texturized yarn and a nonwoven mat of inorganic microfibers, the preferred thickness of the filtering element is in the range from about 3 to about 8 mm. Thicknesses substantially greater than the stated ranges may unduly increase cost and may also result in undesirably high back pressures, whereas thicknesses substantially smaller than the stated ranges may provide inadequate filtering efficiency.

The thickness of the inner filtering element is typically that which is needed to electrically insulate the perforated support tube from the electrically resistive expanded metal sleeve. The inner filter element should be thick enough to provide electrical insulation between the expanded metal sheet and the perforated metal tube. Typically, the thickness of the inner filter element is in the range from 0.25 to about 0.75 cm. Preferably, the thickness of the inner filter element is in the range from about 0.35 to about 0.5 cm.

Preferably, the strands of each expanded metal sheet occupy in the range from about 10 to about 50 percent of its projected area. More preferably, the strands of each expanded metal sheet in the range from about 15 to about 30 percent of its projected area. Projected strand areas with these ranges provide the best compromise between the desired low back pressure across the filter elements, the desired conformability to the associated filter elements, and the desired rigidity or integrity of the expanded metal sheet.

The electrical resistivity of the expanded metal can be tailored, for example, by the choice of metal used and by the cross-sectional area of the strands.

Preferably, the power concentration of the expanded metal configuration used is in the range from about 2 to about 10 watts per square centimeter. Power consumption values within these ranges typically provide reasonable regeneration performance without excess energy consumption.

The metal comprising the expanded metal sheet should be resistant to high temperatures (e.g., temperatures above about 600° C., be chemically resistant to diesel exhaust, and be ductile. Preferred metals include, for example, stainless steel (commercially available, for example, from Falcon Stainless and Ally Corp. of Waldwick, N.J.) and nickel-chrome-iron alloys (including, for example, those commercially available under the trademarked designations "INCONEL 600" and "INCOLY 800" from Inco Alloy International, Inc. of Huntington, Va., "HAYNES 556" from Haynes International of Kokomo, Ind., and "KANTHAL A1" from The Kanthal Corp. of Bethel, Conn.).

The expanded metal sheet can be formed from a metal sheet using conventional metal expanding techniques.

The minimum cross-sectional area of each strand is preferably in the range from about 0.002 to about 0.25 $mm^2$. More preferably, the minimum cross-sectional area of each strand is in the range from about 0.05 to about 0.15 $mm^2$.

Additional details regarding the constructions of diesel particulate filters such as illustrated in FIGS. 1–4 are disclosed in assignees co-pending applications entitled "Concentric-Tube Diesel Particulate Filter", U.S. Ser. No. 07/784,149, now U.S. Pat. No. 5,171,341, and "Diesel Particulate Trap of Perforated Tubes Wrapped With Cross-Wound Inorganic Yarn to Form 4-Sided Filter Traps", U.S. Ser. No. 07/681,147, both filed the same date as this application, the disclosures of which are incorporated herein by reference.

Figure 5:
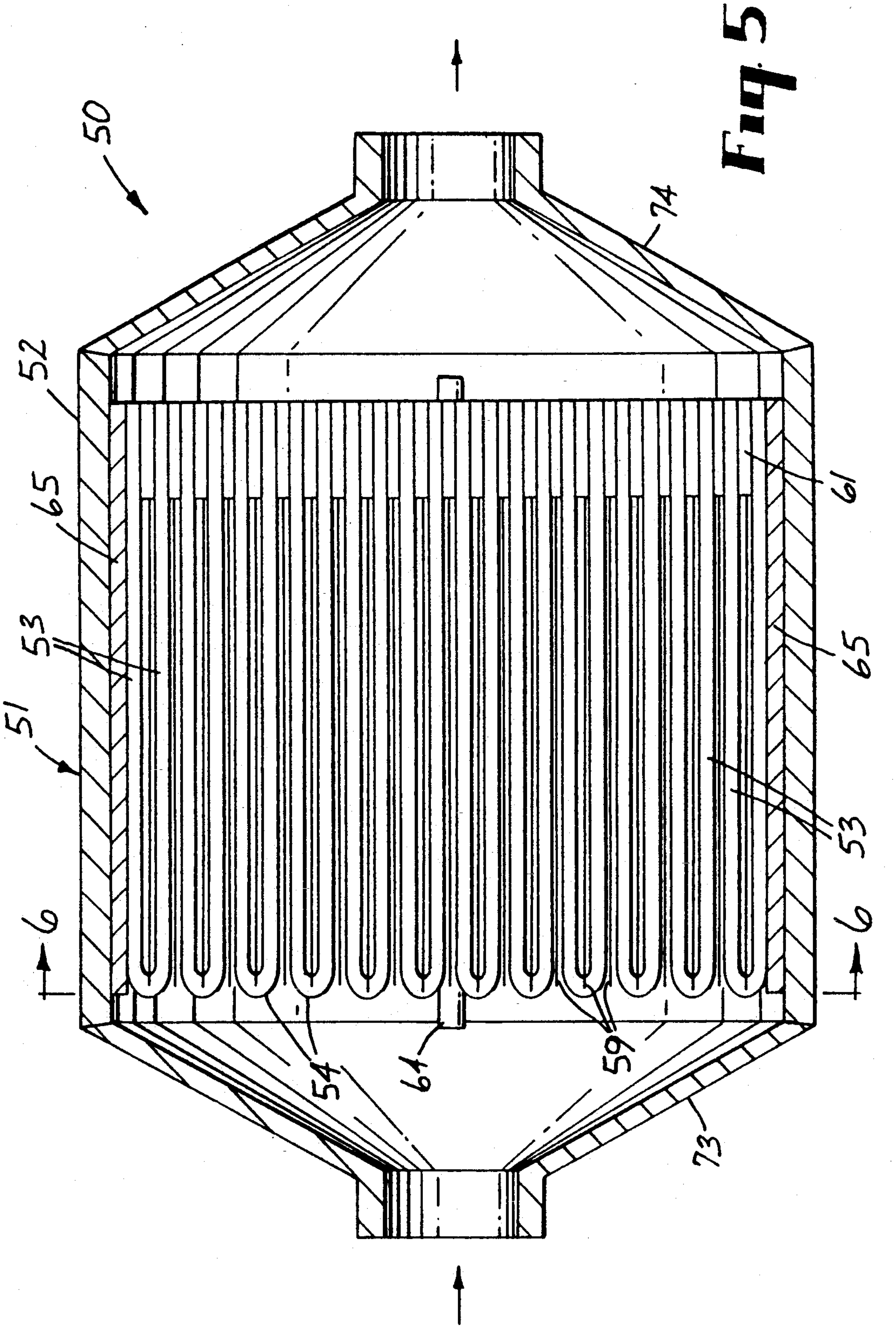
FIG. 5 is a longitudinal central section through another preferred diesel particulate tap according to the invention.
Figure 6:
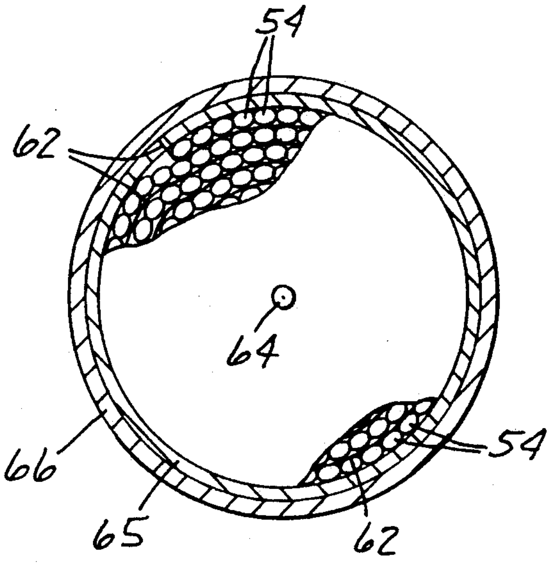
FIG. 6 is a cross section along line 6—6 of FIG. 5.

Referring to FIGS. 5 and 6, diesel particulate filter 50 comprises casing 51 comprising cylindrical body 52, conical exhaust inlet 73, and conical exhaust outlet 74. Filling cylindrical body 52 is a filtering element comprising bundle of tubes 53, wherein each tube comprises one of woven, braided, and knitted inorganic yarn, and wherein the tubes extend between the inlet and outlet ends of cylindrical body 52, and wherein the tubes are substantially parallel to each other. Each of tubes 53 are integral with an adjacent tube, open at the end of the bundle adjacent outlet 74 and blocked at the other end by fold 54.

Figure 7:
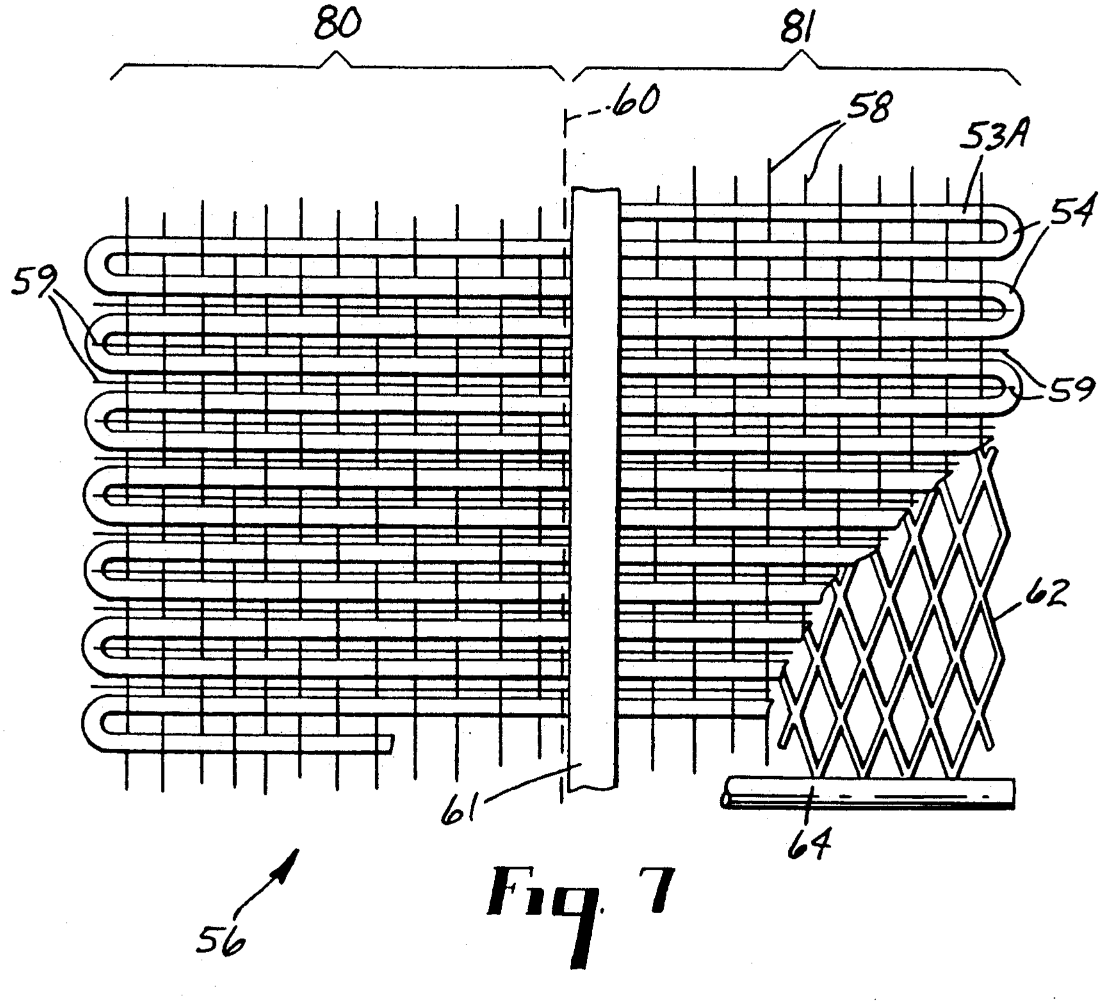
FIG. 7 is a plan view of materials that can be convolutely wound to make the diesel particulate trap of FIGS. 5 and 6.

Referring to FIG. 7 the filtering element comprises flat-style fabric 56. Flat-style fabric 56 comprises a warp of inorganic yarns 58, long braided tubing 53A that extends back-and-forth across the fabric in straight parallel segments and is folded at each side of the fabric. Extending the length of channels between adjacent tubes are inorganic yarns 59.

Fabric 56 is preferably slit centrally along dashed line 60, dividing the fabric into strips 80 and 81, wherein tubes 53A of each strip are open at one edge of the strip and are blocked by folds 59 at the opposite edge.

In a preferred embodiment, a narrow piece of inorganic nonwoven mat 61 is laid along the edge of a strip adjacent the open ends of tubes 53A to provide a stuffer.

Expanded metal sheet 62 is laid over mat 61, if present. If mat 61 is not present, sheet 62 is laid in the same location as shown for mat 61. Electrically connected along the edge of expanded metal sheet 62 at one margin of fabric 56 is bus bar 64.

To provide a filter having the electrically regenerable means incorporated therein, fabric 56, metal sheet 62, and mat 61 (if present) are spirally wound together into a roll, with bus bar 64 substantially at the center of the roll. The exterior surface of the roll is optionally covered with intumescent mat 65, which is expanded by heating prior to or during the first use of filter 50, becoming securely held by cylindrical body 52.

The outer edge of expanded metal sheet 62 is electrically connected to the inner face of cylindrical body 52 at region 66. Bus bar 64 is connected to a conventional switch (not shown) which is connected to a conventional power source (not shown).

Diesel particulate filter 50 can have a single expanded metal sheet, as shown, or it can comprise plurality of expanded metal sheets positioned end-to-end such that they are substantially co-terminus with a strip of fabric 56. For the latter construction, the ends of each expanded metal sheet are independently connected across a power source such that the expanded metal sheets can be energized sequentially.

The materials used to construct the type of filter illustrated in FIGS. 5–7 (i.e., the casing, inorganic yarns, heat-fugitive yarns, and expanded metal) are similar to those described above for the filter types illustrated in FIGS. 1–4. However, the diameter of the inorganic yarn is preferably in the range from about 1 to about 6 mm. The diameter of the inorganic fibers comprising the inorganic yarn are preferably in the range from about 5 to about 20 micrometers. More preferably, the inorganic fibers comprising the inorganic yarn have a diameter in the range from about 7 to about 15 micrometers. The number of individual fibers comprising the inorganic yarn is preferably in the range from about 420 to about 7800, and more preferably in the range from about 1560 to about 4680 individual fibers.

The woven, braided, or knitted tubing can be formed using conventional weaving, braiding, or knitting techniques.

Means for restricting the flow of exhaust gas along channels between adjacent tubes can be provided, for example, by fillers extending the length of the channel. Fillers should be selected to enhance the filtering action without significant back pressure. Particularly useful fillers include, for example, inorganic fibers or inorganic yarn. The yarn or fiber can be woven along with the tubes into a flat-style fabric using conventional weaving techniques.

Optionally, the flat-style fabric can be slit centrally between the folds to provide two strips, each containing a plurality of parallel tubes. Each of the tubes is integral with an adjacent tube, open adjacent one edge of the strip, and blocked by a fold at the other edge of the strip. A length of each of those strips can be spirally rolled or folded to provide a bundle that can be inserted into a casing such that the tubes extend between the ends of the casing.

An alternate diesel particulate filter embodiment according to the present invention comprises a filter element comprising short tubes comprising one of woven, braided, and knitted inorganic yarns, wherein each tube extends only from one edge of the filtering element to the other and is blocked by either end, e.g., by being pinched. Preferably, the unblocked ends of the tubes are adjacent the inlet end of the casing. More preferably, the unblocked ends of the tubes are adjacent the outlet end of the casing. The latter filter element arrangement typically provides better filtering efficiency than the former.

Optionally, the tubes comprising the filtering element can be formed into a flat-style fabric that incorporates a substantially continuous tubing comprising one of woven, braided, and knitted inorganic yarns, wherein the tubing extends back-and-forth across the fabric in straight parallel segments and is folded at each side of the fabric. The tubing can be held in that zig-zag pattern by, e.g., being interwoven with a warp or by being placed in contact with a pressure-sensitive sheet or scrim material. Useful materials for the warp include, for example, inorganic yarns, organic yarns, and fibrillated organic films. Useful pressure-sensitive sheet materials include, for example, masking tape, transfer tape, and transfer film tape (commercially available under the trademarked designation "SCOTCH MASKING TAPE", "SCOTCH TRANSFER TAPE", and "SCOTCH TRANSFER FILM" from the 3M Company of St. Paul, Minn.).

The warp or sheet or scrim by which the tubing is held in a zig-zag pattern can further comprise heat-fugitive materials that can be burned away during or prior to the first use of the novel diesel particulate filter. The space left by the burned away heat-fugitive material can provide a reduced back pressure and an enhanced access of exhaust particulates to particulate-trapping areas of the filtering element.

The filtering or trapping efficiency of the filter element can be enhanced by incorporating a stuffer therein, wherein the stuffer supplements the filtering function of the tubes and of the fillers, if present. The stuffer is typically interleaved in the filter element by rolling or folding the tubes or flat-style fabric comprising the tubes together with the stuffer. Particularly useful stuffers include, for example, nonwoven mats comprising inorganic fibers, which are described above.

Materials useful for restricting the flow of exhaust gas along the channels between the filtering element and the casing include, for example, an intumescent mat and stuffers. The preferred means for restricting the flow along the channels between the filtering element and the casing is the intumescent mat. The intumescent mat is preferred, because when heated it expands allowing the filter element to be securely fixed within the casing. Intumescent mats are commercially available and include, for example, that marketed under the trademarked designation "INTERAM 2600, Series I" from the 3M Co.

The tubes, warp yarns, or filler can further comprise heat fugitive yarn. The passageways left behind when the fugitive fibers are burned away during or prior to the first use of the filter may provide both reduced back pressure and enhanced access to the filtering fibers. The fugitive fiber is particularly useful in amounts up to about 30 volume percent, based on the total volume of the inorganic fibers comprising the tubes, warp yarns, or fillers and the heat-fugitive fibers.

The warp can comprise up to 100 volume percent organic yarns. Preferably, the warp comprises about 75 to about 100 volume percent organic yarn.

Additional details regarding the construction of diesel particulate filters such as illustrated in FIGS. 5–7 are disclosed in assignees co-pending application entitled "Roll-Pack Diesel particulate Filter", U.S. Ser. No. 07/681,150, filed the same date as this application, the disclosure of which is incorporated herein by reference.

In each of the three embodiments illustrated in FIGS. 1–7, the diesel particulate trap includes a plurality of tubes, each incorporated filtering means over substantially its entire length. Each of the tubes extends between the ends of the cylindrical body, and blocking means adjacent the ends of the cylindrical body require the exhaust to travel through the walls of the tubes, trapping particulates in the exhaust. Alternatively, the regenerable diesel particulate trap of the invention can utilize any means that require exhaust to pass through a filtering element and the expanded metal sheet or sleeves, whereby exhaust particulates are trapped close to the expanded metal to be burned off.

To aid in the oxidation of carbon and soluble organic constituents (e.g., hydrocarbons and carbon monoxide) of diesel exhaust soot particulates, the filter element can further comprise an oxidation catalyst coated onto the inorganic yarn, inorganic nonwoven mat, or a combination thereof. Such oxidation catalysts are known in the art and include, for example, precious metals (e.g., platinum, rhodium, other platinum group metals, and silver) and base metals (e.g., copper, iron, maganese, and potassium). Methods for coating the catalyst onto the inorganic yarn and nonwoven mat are known in the art.

Objects and advantages of this invention are further illustrated by the following examples, but the particular materials and amounts thereof recited in these examples, as well as other conditions and details, should not be construed to unduly limit this invention.

EXAMPLE

A diesel particulate filter cartridge substantially as shown in FIG. 2 was constructed. The 406 mm long perforated tube, which had an outside diameter of about 5 mm, was made of 0.8 mm thick 304 stainless steel. The 4 mm diameter perforations were uniformly spaced on the tube on 4.8 mm staggered centers, except about 2.5 cm lengths at each tube end were non-perforated.

The perforated tube was cross-wound with 7 layers of a 2/2, 1.5z, 1800-denier alumina-boria-silica ceramic yarn (commercially available under the trademarked designated "NEXTEL 312 CERAMIC YARN" from the 3M Co. of St. Paul, Minn.), wherein one layer is equivalent to twenty winding passes in each direction across the length of the tube.

Specifically, the ceramic yarn was helically cross-wound around the tube using a 3-axis computer-controlled precision winding machine (Automation Dynamics of Signal Hill, Calif.). The winding angle for the first layer was about 45°. The spacing between the center of each adjacent strand of yarn on the same winding pass was about 5 cm. During winding the yarn was kept at a constant tension of about 14.2 Newtons. For each successive layer, the winding angle was increased slightly (i.e., about 0.25°) so that the core of the yarn for each successive layer was aligned with the core of the yarn of the underlying core of yarn such that 4-sided openings were provided. For the first layer of cross-wound yarn, the opening size between opposite corners of the "4-sided openings" was about 4.6 mm in the axial direction of the tube and about 6.6 mm in the circumferential direction of the tube. The total thickness of the filter element (i.e., the seven layers of cross-wound yarn) was about 3.2 mm.

At each imperforated area of the tube (i.e., at each end of the tube) the winding pattern was modified to have a 70° dwell, providing dense end walls, which serves to block unfiltered exhaust gas escaping at the ends of the filter.

The 0.6 mm thick expanded metal sheet was made of a nickel-chrome-iron alloy (electrically resistivity of about $1.03\times10^{-3}$ ohms/m; commercially available under the trademarked designation "INCONEL 600" from Inco Alloy International, Inc. of Huntington, Va.). The metal was expanded using a conventional metal expanding process. The strand width of metal between the openings, which were about 1.8 mm circumferentially and about 0.4 mm axially, was about 0.1 mm. The electrical resistance of the expanded metal sheet was about 0.22 ohms. The ends of the expanded sheet metal were welded to 0.9 mm thick stainless steel rings.

The outer surface of the expanded metal sheet was substantially helically cross-wound, as described above, with 14 layers of a 2/2, 1.5z, 1800-denier alumina-boria-silica ceramic yarn (NEXTEL TM 312 CERAMIC YARN), which had been texturized using an air jet texturizing machine (commercially available under the trade designation "MODEL 17 SIDEWINDER" with a "MODEL 52D JET" from Enterprise Machine and Development Corp. of New Castle, DE). The speed of the texturizing machine was set at about 26.5 meters per minute. The jet was opened about $\frac{3}{4}$ of a turn from its most closed position. The air pressure was set at about 790kPa. For the fourteenth layer of cross-wound yarn, the opening size between opposite corners of the "4-sided openings" was about 5.3 mm in the axial direction of the tube and about 7.5 mm in the circumferential direction of the tube. The total thickness of the outer filter element was about 12 mm.

The resulting filter cartridge was placed in the exhaust system of a 2.3 liter, four cylinder, four stroke, indirect injection diesel engine (commercially available under the trade designation "CUMMINS 4A2.3 DIESEL ENGINE" from Cummins Engine Co. of Columbus, Ohio).

The particle trapping efficiency of the filter was measured using conventional multiple batch filter sampling at the inlet (i.e., instream) and outlet (i.e., downstream) of the filter, using the filter handling procedures outlined in 40 CFR §86.1339-86 (1989), the disclosure of which is incorporated herein by reference. The membrane filters used were 47 mm in diameter (commercially available under the trademarked designation "PALLFLEX TEFLON MEMBRANE FILTERS" from Pallflex Products Corp. of Putnam, Conn.).

To calculate the efficiency of the diesel particulate filter, the mass concentration of the downstream sample (i.e., the amount of soot in the downstream membrane filter divided by the volume of the sample) was divided by the mass concentration of the upstream sample (i.e., the amount of soot in the upstream membrane filter divided by the volume of the sample). This quotient was subtracted from unity and the result multiplied by 100. The efficiency of the diesel particulate filter at the beginning of the test was about 55%, at an exhaust flow rate of about 2.3 $m^3$/min. The efficiency at the end of the test was about 78%, at an exhaust flow rate of about 2.3 $m^3$/min.

The pressure which the diesel particulate filter was subjected to was measured before and after the test using a conventional flow bench having a blower with an adjustable air flow, and having a connection pipe about 5 cm in diameter. The back pressure at the beginning of the test was about 15 cm of water. The engine was run for about 3 hours, after which time, the back pressure was about 89 cm of water.

The cartridge was then energized by applying about 24 volts at about 110 amps across the expanded metal for about 2 minutes. The pressure drop across the regenerated filter element was about 22.8 cm of water.

The filter cartridge was again loaded into the exhaust system of the diesel engine and loaded with soot for about 2.5 hours. The back pressure across the loaded filter element was about 106 cm of water. The filter cartridge was regenerated as described above. The back pressure across the regenerated filter element was about 27.9 cm of water.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A diesel particulate filter comprising (a) a casing having at least two ends;

(b) means for connecting said at least two ends of said casing to an exhaust system;

(c) means for supporting at least one tube;

(d) at least one substantially rigid tube extending between said at least two ends of said casing, said at least one tube having two ends, an outer surface, and perforations that provide a perforated area, said at least one tube being supported by said supporting means;

(e) at least one filtering element within said casing, said at least one filtering element comprising inorganic yarn, said inorganic yarn being substantially helically cross-wound around said at least one tube to cover said perforations, wherein said inorganic yarn comprises a core from which at least one of loops of continuous fibers or fiber segments extend outwardly, wherein successive convolutions are oppositely wound in each layer to provide interwoven cores, cores of successive convolutions of each successive layer are radially aligned to provide walls that are spaced to define four-sided openings, said walls providing stabilization to said filtering element against exhaust forces, wherein said convolutions of said yarn at said perforated area of said at least one tube extend at an angle in the range from about 30° to about 70° to the axis of said tube in each winding direction, and wherein said at least one of loops of fibers or said fiber segments project into each of said four-sided openings, with at least one of loops of fibers or fiber segments of adjacent convolutions being intermeshed to provide with each of said four-sided openings a trap for diesel exhaust particulates;

(f) at least one electrically resistive expanded metal sheet having two major faces, wherein substantially each major face of said at least one expanded metal sheet is in contact with said at least one filtering element, said at least one expanded metal sheet being sufficiently electrically resistive such that when a voltage is applied across said expanded meal, said expanded metal heats to a temperature sufficient to burn soot particles trapped in said at least one filter element after use;

(g) means for forcing exhaust gases to pass through both said at least one filtering element and said at least one expanded metal sheet; and (h) means for applying a voltage across said at least one expanded metal sheet to heat it above the combustion point of entrapped diesel exhaust particulates.

2. The diesel particulate filter according to claim 1 further comprising at least two of said electrically resistive expanded sheets and means for sequentially energizing said at least two expanded metal sheets to burn off entrapped exhaust particles.

3. The diesel particulate filter according to claim 2 further comprising means for blocking exhaust gases from passing through each of said at least two expanded metal sheets.

4. The diesel particulate filter according to claim 1 comprising a plurality of tubes, wherein said tubes are spaced side by side, and wherein each of said tubes is blocked at one end of said casing.

5. The diesel particulate filter according to claim 1 wherein said inorganic yarn is substantially helically cross-wound around said at least one tube to cover said perforations.

6. The diesel particulate filter according to claim 1 wherein said perforations are covered by two filtering elements and said at least one expanded metal sheet is interposed between said two filtering elements.

7. The diesel particulate filter according to claim 1 wherein said at least one tube has a perforated area, said convolutions of said yarn at said perforated area of said at least one tube extends at an angle of from about 30° to about 70° to the axis of said at least one tube in each winding direction.

8. The diesel particulate filter according to claim 1 wherein said at least one tube has a perforated area, said convolutions of said yarn at said perforated area of said at least one tube extends at an angle of from about 30° to about 60° to the axis of said at least one tube in each winding direction.

9. The diesel particulate filter according to claim 1 wherein said at least one tube has a perforated area, said convolutions of said yarn at said perforated area of said at least one tube extends at an angle of from about 45° to about 55° to the axis of said at least one tube in each winding direction.

10. The diesel particulate filter according to claim 1 wherein said four-sided openings comprising a single cross-wound layer are diamond-shaped and are of uniform size.

11. The diesel particulate filter according to claim 1 wherein each of said four-sided openings is in the range from about 3 to about 10 mm between the closest opposite corners of said four-sided opening.

12. The diesel particulate filter as defined in claim 1 wherein said at least one perforated tube has an imperforate area at each end thereof, and said cores of adjacent convolutions of said yarn at the imperforate areas are spaced closely to provide relatively thick end walls that are substantially impervious to the flow of exhaust.

13. The diesel particulate filter as defined in claim 12 wherein said at least one filtering element has an upstream region and a downstream region, wherein the amount of said at least one of fiber loops or fiber segments is greater in said downstream region than in said upstream region, said upstream region being positioned such that exhaust gases pass therethrough prior to passing through said downstream region.

14. The diesel particulate filter according to claim 1 wherein said at least one filtering element has an upstream region and a downstream region, wherein the amount of said at least one of fiber loops or fiber segments is greater in said downstream region than in said upstream region, said upstream region being positioned such that exhaust gases pass therethrough prior to passing through said downstream region.

15. The diesel particulate filter according to claim 1 wherein interposed between said yarn and said at least one perforated tube is at least one inorganic nonwoven mat comprising inorganic fibers.

16. The diesel particulate filter according to claim 1 wherein each filtering element has an annular thickness in the range from about 5 to about 25 mm.

17. The diesel particulate filter as defined in claim 1 wherein said inorganic yarn is a ply-twisted inorganic yarn.

18. The diesel particulate filter in claim 1 wherein said inorganic yarn is a ceramic yarn.

19. The diesel particulate filter according to claim 1 wherein said at least one filtering element further comprises a heat-fugitive yarn.

20. The diesel particulate filter according to claim 1 wherein said at least one filtering element further comprises an oxidation catalyst material coated onto said inorganic yarn.

21. The diesel particulate filter according to claim 1 wherein said at least one expanded metal sheet has diamond-shaped openings.

22. The diesel particulate filter according to claim 1 wherein said at least one expanded metal sheet is made of a metal selected from the group consisting of stainless steel and a nickel-chrome-iron alloy.

23. A diesel particulate filter comprising (a) a casing having at least two ends;

(b) means for connecting said at least two ends of said casing to an exhaust system;

(c) means for supporting at least one tube;

(d) at least one substantially rigid tube extending between said at least two ends of said casing, said at least one tube having two ends, an outer surface, and perforations that provide a perforated area, said at least one tube being supported by said supporting means;

(e) at least one filtering element within said casing, said at least one filtering element comprising inorganic yarn, said inorganic yarn being substantially helically cross-wound around said at least one tube to cover said perforations, wherein said inorganic yarn comprises a core from which at least one of loops of continuous fibers or fiber segments extend outwardly, wherein successive convolutions are oppositely wound in each layer to provide interwoven cores, cores of successive convolutions of each successive layer are radially aligned to provide walls that are spaced to define four-sided openings, said walls providing stabilization to said filtering element against exhaust forces, wherein said convolutions of said yarn at said perforated area of said at least one tube extend at an angle in the range from about 30° to about 70° to the axis of said tube in each winding direction, and wherein said at least one of loops of fibers or said fiber segments project into each of said four-sided openings, with at least one of loops of fibers or fiber segments of adjacent convolutions being intermeshed to provide with each of said four-sided openings a trap for diesel exhaust particulates;

(f) at least one electrically resistive expanded metal sheet having two major faces, wherein substantially each major face of said at least one expanded metal sheet is in contact with said at least one filtering element, said at least one expanded metal sheet having strands wherein each strand has a cross-sectional area in the range from about 0.002 to about 0.25 $mm^2$;

(g) means for forcing exhaust gases to pass through both said at least one filtering element and said at least one expanded metal sheet; and (h) means for applying a voltage across said at least one expanded metal sheet to heat it above the combustion point of entrapped diesel exhaust particulates.

24. The diesel particulate filter according to claim 23 wherein said cross-sectional area of each strand is in the range from about 0.05 to about 0.15 $mm^2$.

25. A diesel particulate filter comprising (a) a casing having at least two ends;

(b) means for connecting said at least two ends of said casing to an exhaust system;

(c) means for supporting at least one tube;

(d) at least one substantially rigid tube extending between said at least two ends of said casing, said at least one tube having two ends, an outer surface, and perforations that provide a perforated area, said at least one tube being supported by said supporting means;

(e) at least one filtering element within said casing, said at least one filtering element comprising inorganic yarn, said inorganic yarn being substantially helically cross-wound around said at least one tube to cover said perforations, wherein said inorganic yarn comprises a core from which at least one of loops of continuous fibers or fiber segments extend outwardly, wherein successive convolutions are oppositely wound in each layer to provide interwoven cores, cores of successive convolutions of each successive layer are radially aligned to provide walls that are spaced to define four-sided openings, said walls providing stabilization to said filtering element against exhaust forces, wherein said convolutions of said yarn at said perforated area of said at least one tube extend at an angle in the range from about 30° to about 70° to the axis of said tube in each winding direction, and wherein said at least one of loops of fibers or said fiber segments project into each of said four-sided openings, with at least one of loops of fibers or fiber segments of adjacent convolutions being intermeshed to provide with each of said four-sided openings a trap for diesel exhaust particulates;

(f) at least one electrically resistive expanded metal sheet having two major faces, wherein substantially each major face of said at least one expanded metal sheet is in contact with said at least one filtering element, said at least one expanded metal sheet being configured to have, when energized, a power concentration in the range from about 2 to about 10 watts/$cm^2$;

(g) means for forcing exhaust gases to pass through both said at least one filtering element and said at least one expanded metal sheet; and (h) means for applying a voltage across said at least one expanded metal sheet to heat it above the combustion point of entrapped diesel exhaust particulates.

26. A diesel particulate filter comprising (a) a casing having two ends;

(b) means for connecting said at least two ends of said casing to an exhaust system;

(c) at least one filtering element within said casing, said at least one filtering element comprising a plurality of parallel, hollow tubes positioned in a layer, said layer being wound in a spiral, each tube comprising one of woven, braided, or knitted inorganic yarn, said tubes extending between said two ends of said casing said tubes being open at one end and blocked at the other, each of said tubes being integral with one other tube by means of a fold;

(d) at least one electrically resistive expanded metal sheet, wherein substantially the entire area of each face of said at least one expanded metal sheet is in contact with said at least one filtering element, said at least one expanded metal sheet being sufficiently electrically resistive such that when a voltage is applied across said expanded metal, said expanded metal heats to a temperature sufficient to burn soot particles trapped in said at least one filter element after use;

(e) means for restricting flow of exhaust gases along channels between said adjacent ones of said parallel tubes and between said at least one filtering element and said casing; and (f) means for applying a voltage across said at least one expanded metal sheet to heat it above the combustion point of entrapped diesel exhaust particulates.

27. A diesel particulate filter comprising (a) a casing having two ends;

(b) means for connecting said at least two ends of said casing to an exhaust system;

(c) at least one filtering element within said casing, said at least one filtering element comprising a continuous hollow tube comprising one of woven, braided, or knitted inorganic yarn, said tube being folded in a zig-zag pattern to provide a layer comprising a plurality of parallel tube segments, wherein ends of said tube segments are defined by folds, said layer being spirally wound such that said ends of said tube segments extend between said two ends of said casing;

(d) at least one electrically resistive expanded metal sheet, wherein substantially the entire area of each face of said at least one expanded metal sheet is in contact with said at least one filtering element, said at least one expanded metal sheet being sufficiently electrically resistive such that when a voltage is applied across said expanded metal, said expanded metal heats to a temperature sufficient to burn soot particles trapped in said at least one filter element after use;

(e) means for restricting flow of exhaust gases along channels between adjacent ones of said parallel tube segments and between said at least one filtering element and said casing; and (f) means for applying a voltage across said at least one expanded metal sheet to heat it above the combustion point of entrapped diesel exhaust particulates.

28. A diesel particulate filter comprising (a) a casing having an inlet end and an outlet end;

(b) means for connecting said inlet and outlet ends of said casing to an exhaust system;

(c) at least one filtering element within said casing, said at least one filtering element comprising a plurality of parallel, hollow tubes, each tube comprising one of woven, braided, or knitted inorganic yarn, said tubes extending between said at least two ends of said casing in layers, said tubes being open at one of said inlet end or said outlet end of said casing, and said tubes being blocked at one of said outlet end or said inlet end of said casing;

(d) at least one electrically resistive expanded metal sheet, wherein substantially the entire area of each face of said at least one expanded metal sheet is in contact with said at least one filtering element, said at least one expanded metal sheet being sufficiently electrically resistive such that when a voltage is applied across said expanded metal, said expanded metal heats to a temperature sufficient to burn soot particles trapped in said at least one filter element after use;

(e) means for restricting flow of exhaust gases along channels between adjacent ones of said parallel tubes and between said at least one filtering element and said casing; and (f) means for applying a voltage across said at least one expanded metal sheet to heat it above the combustion point of entrapped diesel exhaust particulates.

29. A diesel particulate filter comprising (a) a casing having at least two ends;

(b) means for connecting said at least two ends of said casing to an exhaust system;

(c) means for supporting a plurality of tubes;

(d) a plurality of substantially rigid tubes extending between said at least two ends of said casing, said tubes each having two ends, an outer surface, and perforations that provide a perforated area, said tubes being supported by said supporting means, wherein said tubes are concentrically spaced and substantially fill said casing radially, and wherein means are provided for blocking alternative spaces adjacent ones of said tubes at ends of said tubes, with each space between said tubes being blocked adjacent to one of said at least tow ends of said casing;

(e) filtering elements comprising inorganic yarn being substantially helically wound around said tubes to cover said perforations;

(f) at least one electrically resistive expanded metal sheet, wherein substantially the entire area of each face of said at least one expanded metal sheet is in contact with said at least one filtering element, said at least one expanded metal sheet being sufficiently electrically resistive such that when a voltage is applied across said expanded metal, said expanded metal heats to a temperature sufficient to burn soot particles trapped in said at least one filter element after use;

(g) means for forcing exhaust gases to pass through both a filtering element and an expanded metal sheet; and (h) means for applying a voltage across said at least one expanded metal sheet to heat it above the combustion point of entrapped diesel exhaust particulates.

* * * * *

UNITED STATES PATENT AND TRADEMARK OFFICE

CERTIFICATE OF CORRECTION

PATENT NO. : 5,258,164

DATED : November 2, 1993

INVENTOR(S) : Richard L. Bloom, William T. Fay, Joel H. Sabean, Mark P. Smith

It is certified that error appears in the above-indentified patent and that said Letters Patent is hereby corrected as shown below:

On the title page, under FOREIGN PATENT DOCUMENTS, please add the following references:

| | | |
|---|---|---|
| 0275372 | 1/90 | European Patent Office |
| 0275372A1 | 7/88 | European Patent Office |
| 2193656 | 2/88 | United Kingdom |
| 3545762 | 7/87 | Germany |
| 3731766 | 3/89 | Germany |
| 3800723 | 7/89 | Germany |
| 3801634 | 8/89 | Germany |
| 3823205 | 1/90 | Germany |
| 3910554 | 10/89 | Germany |

Col. 15, Line 5, "meal" should read --metal--.

UNITED STATES PATENT AND TRADEMARK OFFICE

CERTIFICATE OF CORRECTION

PATENT NO. : 5,258,164

DATED : November 2, 1993

INVENTOR(S) : Richard L. Bloom, William T. Fay, Joel H. Sabean, Mark P. Smith

It is certified that error appears in the above-indentified patent and that said Letters Patent is hereby corrected as shown below:

Col. 20, Line 15, "tow" should read --two--.

Signed and Sealed this

Twelfth Day of July, 1994

Attest:

Bruce Lehman

BRUCE LEHMAN

*Attesting Officer* *Commissioner of Patents and Trademarks*